(12) United States Patent
Murray et al.

(10) Patent No.: US 9,869,346 B2
(45) Date of Patent: Jan. 16, 2018

(54) TANDEM TAPERED ROLLER AND ANGULAR CONTACT BALL BEARING

(71) Applicant: Schaeffler Technologies AG & Co. KG, Herzogenaurach (DE)

(72) Inventors: Jonathan Murray, Troy, MI (US); Majkol Spirovski, Macomb Township, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/040,182

(22) Filed: Feb. 10, 2016

(65) Prior Publication Data

US 2017/0227048 A1 Aug. 10, 2017

(51) Int. Cl.
*F16C 19/49* (2006.01)
*F16C 33/36* (2006.01)

(52) U.S. Cl.
CPC .......... *F16C 19/495* (2013.01); *F16C 33/366* (2013.01); *F16C 2326/06* (2013.01)

(58) Field of Classification Search
CPC ...... F16C 19/49; F16C 19/492; F16C 19/495; F16C 19/541; F16C 19/542; F16C 19/546; F16C 19/547
See application file for complete search history.

(56) References Cited

FOREIGN PATENT DOCUMENTS

| CN | 103790950 A | 5/2014 | |
|----|----|----|----|
| DE | 102008046237 A1 * | 3/2010 | ............ F16C 19/225 |
| DE | 102008046251 A1 * | 3/2010 | .............. F16C 19/30 |
| JP | 2014185649 A * | 10/2014 | .............. F16C 27/04 |

* cited by examiner

*Primary Examiner* — Phillip A Johnson
(74) *Attorney, Agent, or Firm* — Adam R. Southworth (57) ABSTRACT

A tandem roller bearing assembly is provided that combines a tapered roller bearing with an angular contact ball bearing, yielding high load capacity with improved efficiency. A one-piece outer ring contains an outer tapered roller raceway and an outer angular contact ball raceway and can support an axial load in a single direction. A one-piece inner ring contains an inner tapered roller raceway and an inner angular contact ball raceway and can support an axial load in a single direction. Various rib configurations are implemented on the inner tapered roller raceway to achieve multiple friction and axial load support options.

7 Claims, 6 Drawing Sheets

TANDEM TAPERED ROLLER AND ANGULAR CONTACT BALL BEARING

TECHNICAL FIELD

Example aspects described herein relate to rolling element bearing assemblies, particularly of bearings that are used in vehicle drivetrains that require high efficiency and minimal packaging space.

BACKGROUND

Given the fuel economy goals of future passenger vehicles, friction and weight reduction are of high importance to automotive engineers. The drivetrain of an automobile consists of multiple arrays of gears and bearings to transfer the rotary motion of the internal combustion engine to the rotary motion of the wheels. The efficiency of the drivetrain has evolved very rapidly in recent years due in large part to improved designs of transmissions, transfer cases and differential units. The design of rolling element bearings has played a vital role in this efficiency gain and will continue to evolve with the innovations of drivetrain technology.

Rolling element bearing assemblies are typically circular in shape, and generally comprise of rolling elements, normally contained by a cage, disposed between inner and outer raceways. Rolling elements take many forms, including spherical balls, cylindrical rollers, needle rollers, or various other configurations, such as cone-shaped tapered rollers or barrel-shaped spherical rollers. Cages are often used to contain the rolling elements and guide them throughout the rotating motion of the bearing, but are not a necessity in some configurations. The material of a cage can vary from steel to plastic, depending on the application, duty cycle, along with noise and weight requirements.

Figure 11:
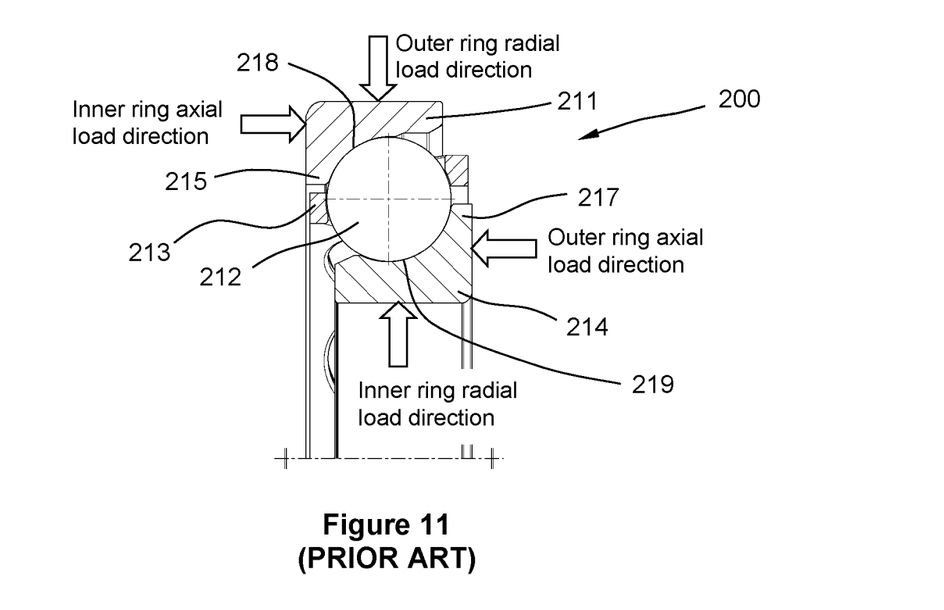
FIG. 11 is a cross-sectional view of a prior art angular contact ball bearing assembly.

The type of bearing used for a particular application depends on multiple factors including the load, load direction, required stiffness, and speed. Angular contact ball bearings are known and are able to withstand combined radial and axial loads. One or two rows of balls are possible in a single bearing unit and various arrangements of multiple angular contact ball bearings are possible to address the needs of the application. Referring to FIG. 11, a cross-sectional view of a prior art angular contact ball bearing 200 is shown. Angular contact ball bearing 200 contains an inner ring 214, an outer ring 211, balls 212, and a ball cage 213. The inner ring 214 contains an inner ball raceway 219 with an axial shoulder 217; the outer ring 211 contains an outer ball raceway 218 with an axial shoulder 215. In addition to the inherent radial load capability of a ball bearing, the presence of the respective axial shoulders 217, 215 provides axial load capability in the directions shown in FIG. 11. In general, angular contact ball bearings provide a low-friction solution for drivetrain applications due to a rolling interface that is maintained between the balls 212 and respective inner and outer raceways 219, 218, including axial shoulders 217, 215, when subjected to radial or axial load conditions. However, the load capacity of angular contact ball bearings is relatively low compared to other bearing types.

Figure 10:
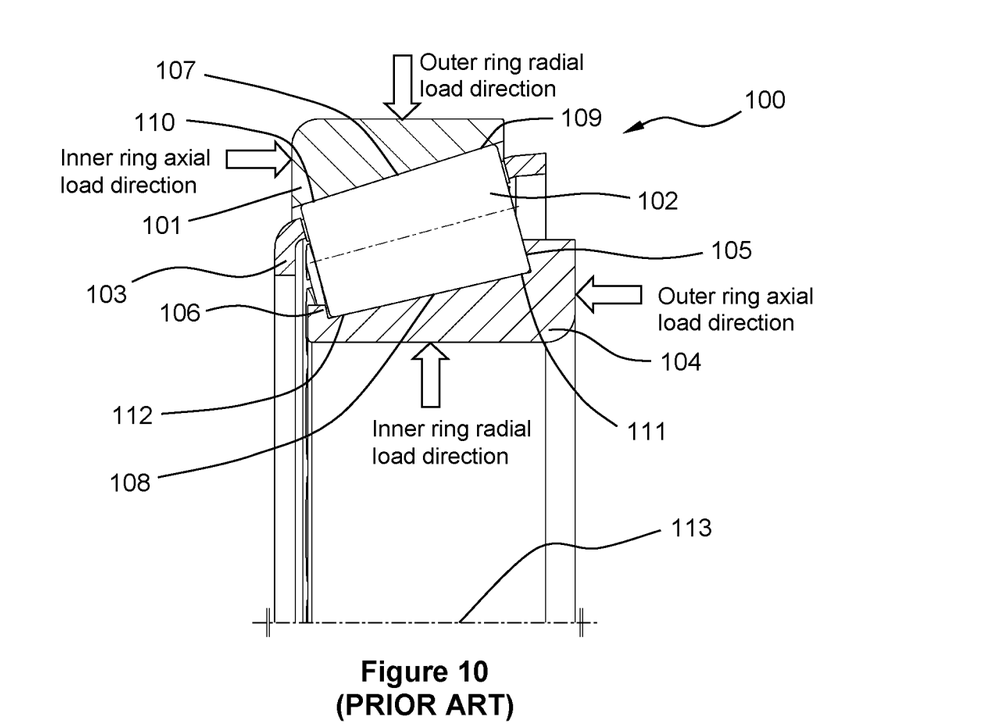
FIG. 10 is a cross-sectional view of a prior art tapered roller bearing assembly.

Like angular contact ball bearings, tapered roller bearings are known and are also able to withstand combined radial and axial loads, but, for a given bearing envelope size, have a significantly higher load capacity than angular contact ball bearings. Referring to FIG. 10, a cross-sectional view of a prior art tapered roller bearing 100 is shown that rotates about a central axis 113. Tapered roller bearing 100 contains an inner ring 104, an outer ring 101, tapered rollers 102 and a tapered roller cage 103. The inner ring 104 contains an inner tapered roller raceway 108 with a small diameter end 112 and a large diameter end 111; a rib 106 is present at the small diameter end 112 and a rib 105 is present at the large diameter end 111. The outer ring 101 contains an outer tapered roller raceway 107 with a small diameter end 110 and a large diameter end 109. The design of tapered roller bearings is such that the inner raceway 108 and outer raceway 107 are angled with respect to the central axis 113 of the tapered roller bearing 100. For a given width of envelope space, the angled inner and outer raceways 108, 107 increase the amount of line contact with the tapered rollers 102 which increases the load capacity of the tapered roller bearing 100. The rib 106 on the small diameter end 112 of the inner raceway 108 is present to retain the tapered rollers 102 on the inner raceway 108. The rib 105 on the large diameter end 111 of the inner raceway 108 serves as a thrust interface for the tapered rollers 102. However, the friction that results from this sliding interface exceeds that of the rolling interface between the balls and axial shoulders of an angular contact ball bearing.

For drivetrain applications, tapered roller bearings offer high load capacity while sacrificing efficiency. A bearing solution is required that maintains the load capacity of a tapered roller bearing while lowering the inherent friction.

SUMMARY OF THE INVENTION

A bearing assembly that combines a tapered roller bearing with an angular contact ball bearing is disclosed. This combination of rolling elements within a single bearing assembly blends the positive attributes of each bearing type to achieve an increased load capacity while minimizing friction. The bearing assembly includes a one-piece outer ring, a one-piece inner ring, tapered rollers, balls, a tapered roller cage and an angular contact ball cage. The outer ring includes an outer tapered roller raceway and an outer angular contact ball raceway with an axial shoulder. The inner ring includes an inner tapered roller raceway and an inner angular contact ball raceway with an axial shoulder. Different aspects of the outer and inner rings include different angular orientations of the tapered roller raceways together with different locations of the axial shoulders of the angular contact ball raceways. Further aspects include an axial rib placed on either or both ends of the tapered roller raceway of the inner ring that can provide tapered roller containment or a thrust interface for the tapered rollers. The aspects that include a rib as a thrust interface on the tapered roller raceway of the inner ring can facilitate a design characteristic where the axial load is partially supported by the rib interface with the tapered rollers and the respective inner and outer ring axial shoulder interfaces with the angular contact balls.

BRIEF DESCRIPTION OF DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

DETAILED DESCRIPTION OF THE INVENTION

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. A radially inward direction is from an outer radial surface of the outer raceway, toward the central axis or radial center of the outer raceway. Conversely, a radial outward direction indicates the direction from the central axis or radial center of the outer raceway toward the outer surface. Axially refers to directions along a diametric central axis. The words "left" and "right" designate directions in the drawings to which reference is made.

Figure 1:
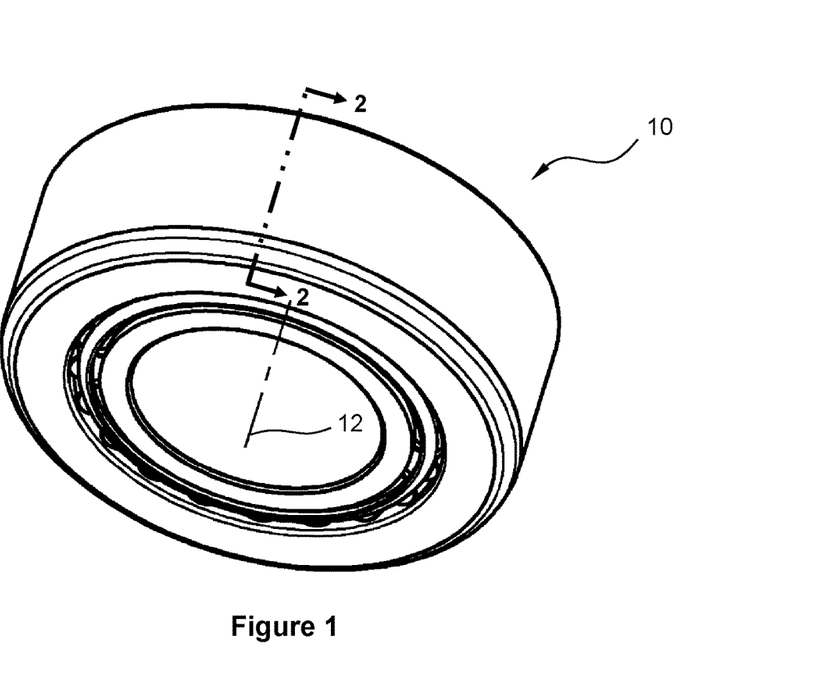
FIG. 1 is a perspective view of a first example embodiment of a tandem tapered roller and angular contact ball bearing assembly.
Figure 2:
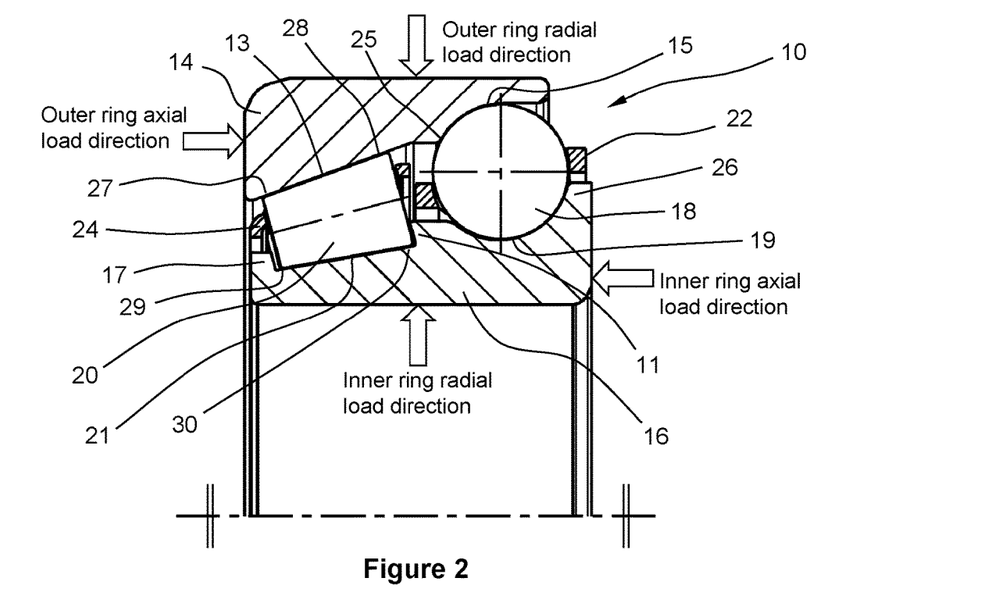
FIG. 2 is a cross-sectional view of the bearing of FIG. 1.

Referring to FIG. 1, a first embodiment of a tandem tapered roller and angular contact ball bearing assembly 10 is shown that rotates about central axis 12. Referring now to FIG. 2, a cross-sectional view of the tandem tapered roller and angular contact ball bearing assembly 10 is shown that includes an outer ring 14, an inner ring 16, tapered rollers 20, a tapered roller cage 24, balls 18, and a ball cage 22. The outer ring 14 contains an outer angular contact ball raceway 15 with an axial shoulder 25, and an outer tapered roller raceway 13. The outer tapered roller raceway 13 has a small diameter end 27 and a large diameter end 28. The inner ring 16 contains an inner angular contact ball raceway 19 with an axial shoulder 26, and an inner tapered roller raceway 21. The inner tapered roller raceway 21 has a small diameter end 29 and a large diameter end 30. A rib 17 is present on the small diameter end 29 and a rib 11 is present on the large diameter end 30 of the inner tapered roller raceway 21. The rib 17 on the small diameter end 29 is present to retain the rollers on the raceway, while the rib 11 on the large diameter end 30 is present to function as a potential thrust interface for the tapered rollers 20. A single row of balls 18 is present on the right hand side, while a single row of tapered rollers 20 is present on the left hand side. With the orientation shown in FIG. 2, the bearing is able to withstand radial loads in addition to an axial load that acts from right to left on the inner ring or an axial load that acts from left to right on the outer ring. This is evident by the orientation of the tapered rollers 20 (increasing diameter from left to right) and the location of the axial shoulder 26 on the inner ball raceway 19 and the axial shoulder 25 on the outer ball raceway 15. The axial design load direction can be reversed by merely installing the bearing such that tapered rollers 20 are on the right side and the balls are on the left relative to the tandem tapered roller and angular contact ball bearing assembly 10 shown in FIG. 2. As is typical for angular contact ball bearings and tapered roller ball bearings, adjustment of axial clearance upon installation is recommended to compensate for the effects of interference fits and thermal expansion of the bearing components, shafts and housings to ensure optimum bearing performance. For the tandem tapered roller and angular contact ball bearing assembly 10 shown in FIG. 2, the axial clearance can be set by either moving the inner ring 16 or outer ring 14 axially relative to the other ring to obtain the desired clearance. In most applications it is desired to eliminate all axial clearance upon installation, even to the extent that the balls or tapered rollers are slightly pre-loaded, representing a "negative clearance" condition. The design of the tandem tapered roller and angular contact ball bearing assembly 10 of FIG. 2 allows the bearing designer to potentially tune the distribution of axial load support between the balls 18 with the axial shoulder 25 of the outer ring 14 and the axial shoulder 26 of the inner ring 16 along with the tapered rollers 20 and the rib 11 on the large diameter end 30 of the inner tapered roller raceway 21 of the inner ring 16. Axial clearance between the balls 18 and their respective axial shoulders 25, 26 versus axial clearance between the tapered rollers 20 and rib 11 can be adjusted in the design to either partially support the axial load between these interfaces (the total axial load is divided equally or unequally between interfaces of an amount greater than 0% but less than 100%), or such that either the balls 18 or tapered rollers 20 support 100% of the axial load. In an effort to reduce bearing friction, a designer could adjust the axial clearances such that the balls 18 would support most of the applied axial load, as rolling friction between the balls 18 and their respective axial shoulders 25, 26 is less than the sliding friction between the tapered rollers 20 and the rib 11.

Figure 3:
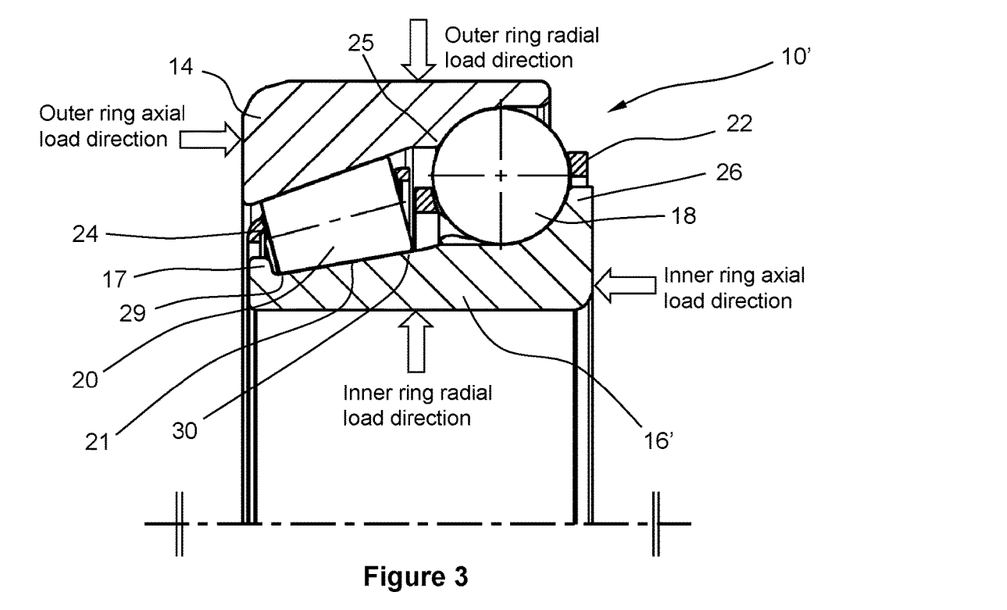
FIG. 3 is a cross-sectional view of a second example embodiment of a tandem tapered roller and angular contact ball bearing assembly.

Referring to FIG. 3, a second example embodiment of a tandem tapered roller and angular contact ball bearing assembly 10' is shown that includes an inner ring 16' which does not have a rib at the large diameter end 30 of the inner tapered roller raceway 21. With the orientation shown in FIG. 3, the bearing is able to withstand radial loads in addition to an axial load that acts from right to left on the inner ring 16' or an axial load that acts from left to right on the outer ring 14. Axial clearance is set by either moving the inner ring 16' or outer ring 14 axially relative to the other ring; however, due to the absence of the aforementioned rib, for this second embodiment the axial clearance is always a function of axial clearance between the balls 18 and their respective axial shoulders 25, 26 on the outer ring 14 and the inner ring 16'.

Figure 4:
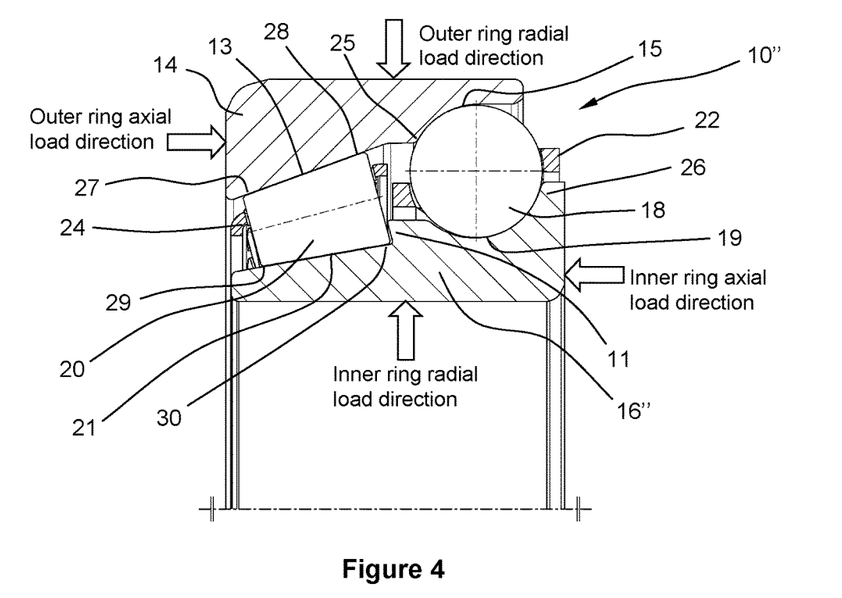
FIG. 4 is a cross-sectional view of a third example embodiment of a tandem tapered roller and angular contact ball bearing assembly.

Referring to FIG. 4, a third example embodiment of a tandem tapered roller and angular contact ball bearing assembly 10" is shown that includes an inner ring 16" which does not have a rib 11 at the small diameter end 29 of the inner tapered roller raceway 21, but does have a rib at the large diameter end 30 of the inner tapered roller raceway 21. With the orientation shown in FIG. 4, the bearing is able to withstand radial loads in addition to an axial load that acts from right to left on the inner ring 16″ or an axial load that acts from left to right on the outer ring 14. The axial load direction that the bearing can withstand can be reversed by merely installing the bearing such that the tapered rollers 20 are on the right side and the balls 18 are on the left compared to the configuration shown in FIG. 4. Axial clearance is set by either moving the inner ring 16″ or outer ring 14 axially relative to the other ring. The design of this bearing allows the bearing designer to potentially tune the distribution of the axial load support between the balls 18 and tapered rollers 20 as described for the first example embodiment in FIGS. 1 and 2.

Figure 5:
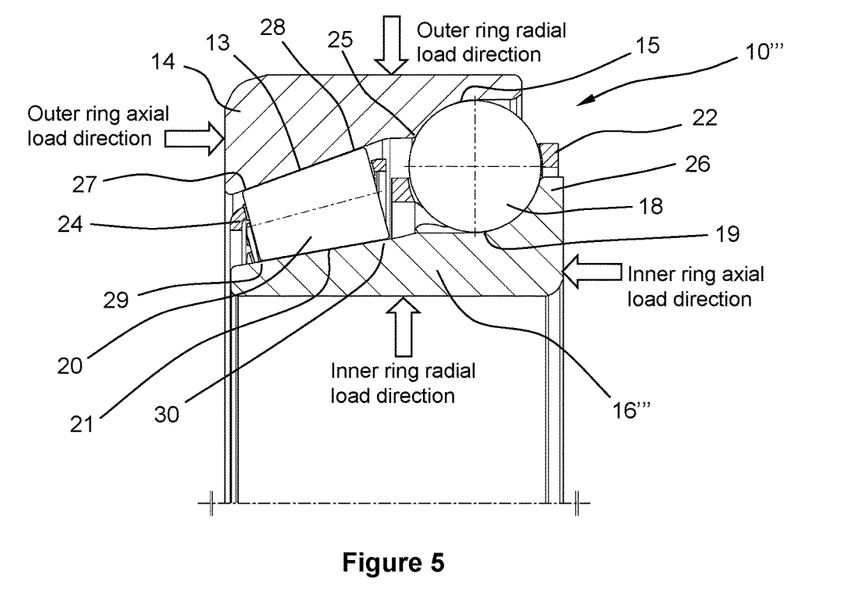
FIG. 5 is a cross-sectional view of a fourth example embodiment of a tandem tapered roller and angular contact ball bearing assembly.

Referring to FIG. 5, a fourth example embodiment of a tandem tapered roller and angular contact ball bearing assembly 10‴ is shown that includes an inner ring 16‴ which does not have rib at the small diameter end 29 of the inner tapered roller raceway 21 or the large diameter end 30 of the inner tapered roller raceway 21. A single row of balls 18 is present on the right hand side, while a single row of tapered rollers 20 is present on the left hand side. With the orientation shown in FIG. 5, this bearing is able to withstand radial loads in addition to an axial load that acts from right to left on the inner ring 16‴ or an axial load that acts from left to right on the outer ring 14. The axial load direction that the bearing can withstand can be reversed by merely installing the bearing such that tapered rollers 20 are on the right side and the balls 18 are on the left compared to the configuration shown in FIG. 5. As in the previous example embodiments, the axial clearance is set by either moving the inner ring 16‴ or outer ring 14 axially relative to the other ring; however, due to the absence of a rib to serve as a thrust interface for tapered rollers 20, for this fourth example embodiment the axial clearance is always a function of the clearance between the balls 18 and their respective axial shoulders 25, 26 on the outer ring 14 and the inner ring 16‴.

Figure 6:
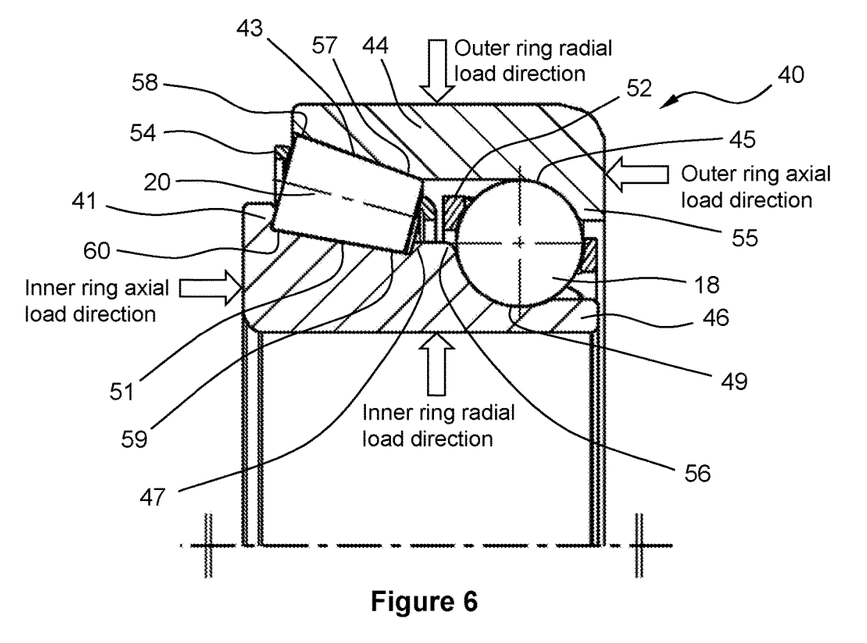
FIG. 6 is a cross-sectional view of a fifth example embodiment of a tandem tapered roller and angular contact ball bearing assembly.

Referring to FIG. 6, a fifth example embodiment of a tandem tapered roller and angular contact ball bearing assembly 40 is shown. The tandem tapered roller and angular contact ball bearing assembly 40 includes an outer ring 44, an inner ring 46, tapered rollers 20, a tapered roller cage 54, balls 18, and a ball cage 52. The outer ring 44 contains an outer angular contact ball raceway 45 with an axial shoulder 55, and an outer tapered roller raceway 43. The outer tapered roller raceway 43 has a small diameter end 57 and a large diameter end 58. The inner ring 46 contains an inner angular contact ball raceway 49 with an axial shoulder 56, and an inner tapered roller raceway 51. The inner tapered roller raceway 51 has a small diameter end 59 and a large diameter end 60. A rib 47 is present on the small diameter end 59 and a rib 41 is present on the large diameter end 60 of the inner tapered roller raceway 51. The rib 47 on the small diameter end 59 is present to retain the rollers on the raceway, while the rib 41 on the large diameter end 60 is present to function as a potential thrust interface for the tapered rollers 20. A single row of balls 18 is present on the right hand side, while a single row of tapered rollers 20 is present on the left hand side. With the orientation shown in FIG. 6, this bearing is able to withstand radial loads in addition to an axial load that acts from left to right on the inner ring 46 or an axial load that acts from right to left on the outer ring 44. This is evident by the orientation of the tapered rollers 20 (increasing diameter from right to left) and the location of the axial shoulder 56 on the inner ball raceway 49 and the axial shoulder 55 on the outer ball raceway 45. The axial design load direction can be reversed by merely installing the bearing such that tapered rollers 20 are on the right side and the balls 18 are on the left compared to configuration shown in FIG. 6. The design of this bearing allows the bearing designer to potentially tune the distribution of the axial load support between the balls 18 and the axial shoulder 55 of the outer ring 44 and the axial shoulder 56 of the inner ring 46 along with the tapered rollers 20 and the rib 41 on the large diameter end 60 of the inner tapered roller raceway 51 of the inner ring 46. Axial clearance between the balls 18 and their respective axial shoulders 55, 56 versus axial clearance between the tapered rollers 20 and rib 41 can be adjusted in the design to fulfill partial support of the axial load between these interfaces (the total axial load is divided equally or unequally between interfaces of an amount greater than 0% but less than 100%), or such that either the balls 18 or tapered rollers 20 support 100% of the axial load. In an effort to reduce bearing friction, a designer could adjust the axial clearances such that the balls 18 would support most of the applied axial load, as rolling friction between the balls 18 and their respective shoulders 55, 56 is less than the sliding friction between the tapered rollers 20 and the rib 41.

Figure 7:
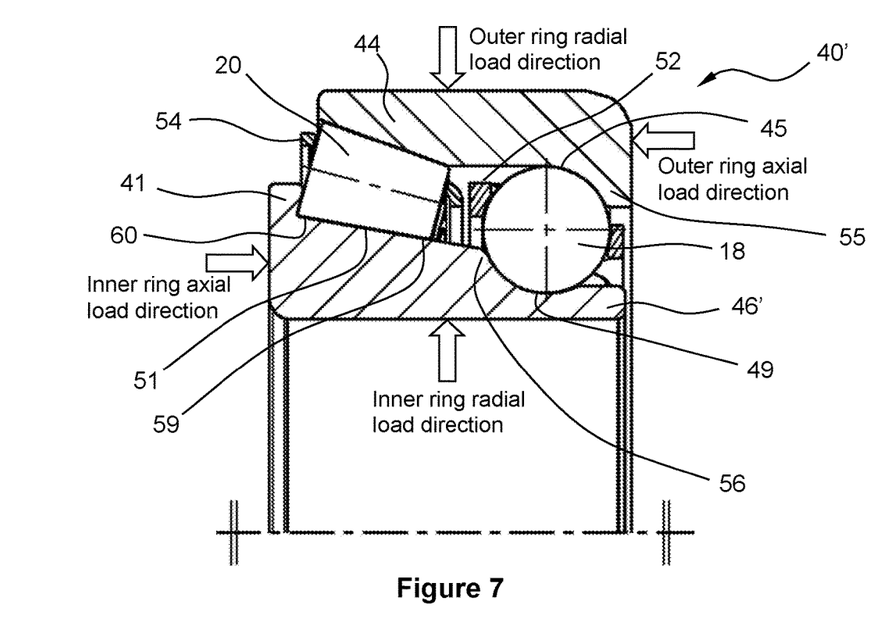
FIG. 7 is a cross-sectional view of a sixth example embodiment of a tandem tapered roller and angular contact ball bearing assembly.

Referring to FIG. 7, a sixth example embodiment of a tandem tapered roller and angular contact ball bearing assembly 40′ is shown that includes an inner ring 46′ which does not have a rib at the small diameter end 59 of the inner tapered roller raceway 51. A single row of balls 18 is present on the right hand side, while a single row of tapered rollers 20 is present on the left hand side. With the orientation shown in FIG. 7, this bearing is able to withstand radial loads in addition to an axial load that acts from left to right on the inner ring 46′ or an axial load that acts from right to left on the outer ring 44. The axial load direction that the bearing can withstand can be reversed by merely installing the bearing such that the tapered rollers 20 are on the right side and the balls 18 are on the left compared to the configuration shown in FIG. 7. The design of this bearing allows the bearing designer to potentially tune the distribution of the axial load support between the balls 18 and tapered rollers 20 as described for the fifth example embodiment in FIG. 6.

Figure 8:
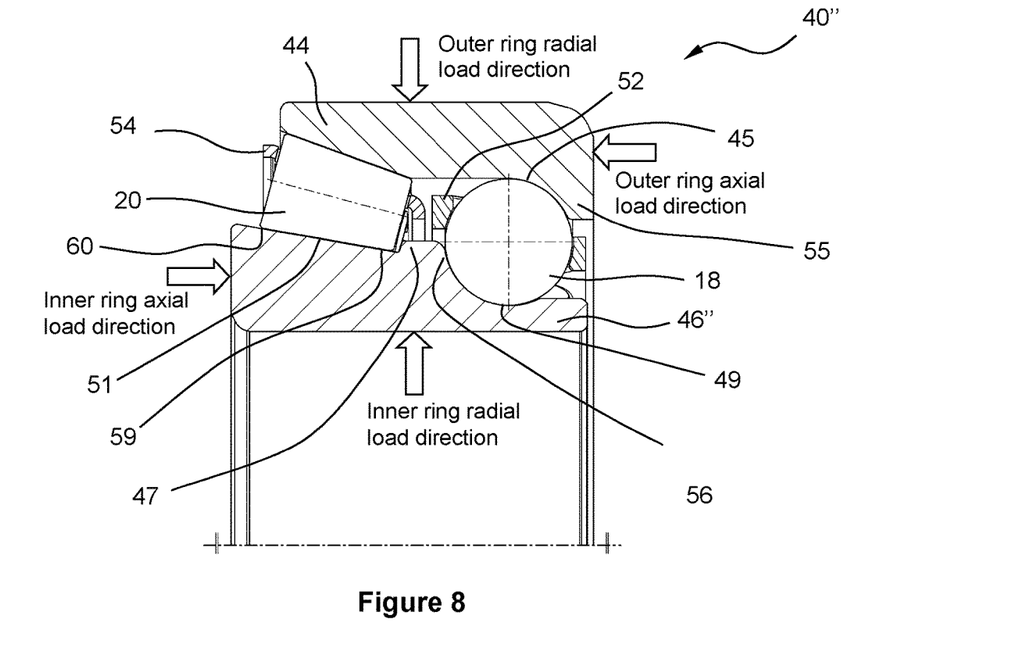
FIG. 8 is a cross-sectional view of a seventh example embodiment of a tandem tapered roller and angular contact ball bearing assembly.

Referring to FIG. 8, a seventh example embodiment of a tandem tapered roller and angular contact ball bearing assembly 40″ is shown that includes an inner ring 46″ which does not have a rib on the large diameter end 60 of the inner tapered roller raceway 51, but does have a rib 47 on the small diameter end 59 of the inner tapered roller raceway 51. With the orientation shown in FIG. 8, the bearing is able to withstand radial loads in addition to an axial load that acts from left to right on the inner ring 46″ or an axial load that acts from right to left on the outer ring 44. The axial load direction that the bearing can withstand can be reversed by merely installing the bearing such that the tapered rollers 20 are on the right side and the balls 18 are on the left compared to the configuration shown in FIG. 8. Axial clearance is set by either moving the inner ring 46″ or outer ring 44 axially relative to the other ring; however, due to the absence of a rib to serve as a thrust interface for tapered rollers 20, for this seventh example embodiment the axial clearance is always a function of the clearance between the balls 18 and their respective axial shoulders 55, 56 on the outer ring 44 and the inner ring 46″.

Figure 9:
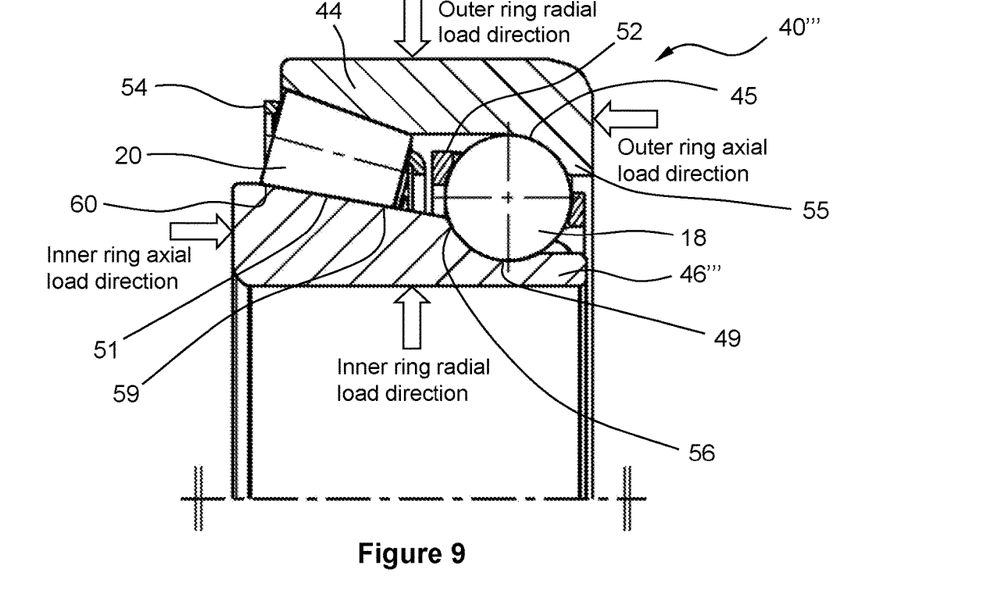
FIG. 9 is a cross-sectional view of an eighth example embodiment of a tandem tapered roller and angular contact ball bearing assembly.

Referring to FIG. 9, an eighth example embodiment of a tandem tapered roller and angular contact ball bearing assembly 40‴ is shown that includes an inner ring 46‴ which does not have a rib on the large diameter end 60 of the inner tapered roller raceway 51 or on the small diameter end 59 of the inner tapered roller raceway 51. A single row of balls 18 is present on the right hand side, while a single row of tapered rollers 20 is present on the left hand side. With the orientation shown in FIG. 9, this bearing is able to withstand radial loads in addition to an axial load that acts from left to right on the inner ring 46''' or an axial load that acts from right to left on the outer ring 44. The axial load direction that the bearing can withstand can be reversed by merely installing the bearing such that tapered rollers 20 are on the right side and the balls 18 are on the left compared to the configuration shown in FIG. 9. As in the previous example embodiments, the axial clearance is set by either moving the inner ring 46''' or outer ring 44 axially relative to the other ring; however, due to the absence of a rib to serve as a thrust interface for tapered rollers 20, for this eighth example embodiment the axial clearance is always a function of the clearance between the balls 18 and their respective axial shoulders 55, 56 on the outer ring 44 and the inner ring 46'''.

For all example embodiments, if additional tapered roller retention is needed, known retention methods may be used. For example, U.S. Pat. No. 8,783,966 describes an arrangement where a tapered roller cage contains projections that interface with a rim on an inner ring to retain the cage and tapered rollers.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures. For example, while all of the bearing embodiments can support axial loads in one direction, they may be arranged in pairs in such a way to increase axial load capacity in a single direction, or in the traditional "X" or "O" configurations to support axial loads in both directions.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

What we claim is:

1. A bearing assembly comprising:
   an outer ring having:
      an angular contact ball raceway on an inner radial surface with an axial shoulder; and
      a tapered roller raceway on the inner radial surface, axially adjacent to the angular contact ball raceway, with a first end having a first diameter and a second end having a second diameter;
   an inner ring having:
      an angular contact ball raceway on an outer radial surface with an axial shoulder;
      a tapered roller raceway on an outer radial surface, axially adjacent to the angular contact ball raceway, with a first end having a third diameter and a second end having a fourth diameter;
   the axial shoulder of the angular contact ball raceway of the outer ring and the tapered roller raceway of the outer ring being configured to receive a first axial load;
   the axial shoulder of the angular contact ball raceway of the inner ring and the tapered roller raceway of the inner ring being configured to receive a second axial load;
   the axial shoulder of the angular contact ball raceway of the outer ring being located axially adjacent to a first axial face of the outer ring;
   the first end of the tapered roller raceway of the outer ring being located axially adjacent to a second axial face of the outer ring, and the second end of the tapered roller raceway of the outer ring being located at a first region between the angular contact ball raceway and the tapered roller raceway, wherein the first diameter is greater than the second diameter;
   the axial shoulder of the angular contact ball raceway of the inner ring being located at a second region between the angular contact ball raceway and the tapered roller raceway; and
   the first end of the tapered roller raceway of the inner ring being located axially adjacent to a second axial face of the inner ring, and the second end of the tapered roller raceway of the inner ring being located at the second region between the angular contact ball raceway and the tapered roller raceway, wherein the third diameter is greater than the fourth diameter;
   a plurality of tapered rollers arranged between the tapered roller raceway of the outer ring and the tapered roller raceway of the inner ring; and
   a plurality of balls arranged between the angular contact ball raceway of the outer ring and the angular contact ball raceway of the inner ring;
   wherein the inner ring includes:
   a rib on the first end of the tapered roller raceway and no rib on the second end of the tapered roller raceway;
   a rib on the second end of the tapered roller raceway and no rib on the first end of the tapered roller raceway; or
   no rib on either the first end of the tapered roller raceway or the second end of the tapered roller raceway.

2. The bearing assembly of claim 1, further comprising a first cage arranged between the tapered roller raceway of the outer ring and the tapered roller raceway of the inner ring, having pockets configured to receive and circumferentially space the tapered rollers.

3. The bearing assembly of claim 2, further comprising a second cage arranged between the angular contact ball raceway of the outer ring and the angular contact ball raceway of the inner ring, having pockets configured to receive and circumferentially space the balls.

4. The bearing assembly of claim 1, wherein there is a rib on the first end of the tapered roller raceway and no rib on the second end of the tapered roller raceway of the inner ring.

5. The bearing assembly of claim 4, wherein the at least one rib on the first end of the tapered roller raceway of the inner ring, the axial shoulder of the angular contact ball raceway of the outer ring, and the axial shoulder of the angular contact ball raceway of the inner ring are configured to partially support the first or second axial loads.

6. The bearing assembly of claim 1, wherein there is a rib on the second end of the tapered roller raceway and no rib on the first end of the tapered roller raceway of the inner ring.

7. The bearing assembly of claim 1, wherein there is no rib on the first end of the tapered roller raceway of the inner ring or the second end of the tapered roller raceway of the inner ring.

* * * * *